May 22, 1934.  J. S. SIMSOHN  1,959,933
WATER HEATING SYSTEM
Filed Aug. 17, 1932   3 Sheets-Sheet 1

WITNESS:

INVENTOR
Julian S. Simsohn
BY
ATTORNEYS.

May 22, 1934.  J. S. SIMSOHN  1,959,933
WATER HEATING SYSTEM
Filed Aug. 17, 1932   3 Sheets-Sheet 3

WITNESS:
Rob't R. Mitchel

INVENTOR
Julian S. Simsohn
BY
Busser & Harding
ATTORNEYS

Patented May 22, 1934

1,959,933

UNITED STATES PATENT OFFICE 1,959,933

WATER HEATING SYSTEM

Julian S. Simsohn, Melrose Park, Pa., assignor to Pennsylvania Range Boiler Company, Philadelphia, Pa., a corporation of Pennsylvania Application August 17, 1932, Serial No. 629,108

2 Claims. (Cl. 122—32)

This invention relates to an improvement in water heating system, and more particularly to one adaptable for the supply of hot water for domestic use.

The system in accordance with this invention comprises a combination of elements whereby an adequate supply of hot water for domestic use may be maintained with a high degree of economy and, at the same time, with maximum efficiency.

Generally speaking the system in accordance with this invention comprises as principal elements a storage tank, which may be of desired capacity, and which is equipped with means whereby contained water will be heated through connection with a domestic heating plant and with independent heating means; the heating elements being automatically controlled in a novel manner so as to promote their use respectively with maximum efficiency. More particuluarly, the system in accordance with this invention comprises various details of the arrangement and structure of the principal elements.

Having now indicated in a general way the nature and purpose of this invention, I will proceed to a detailed description of a preferred embodiment and modifications thereof with reference to the accompanying drawings in which.

Figure 1:
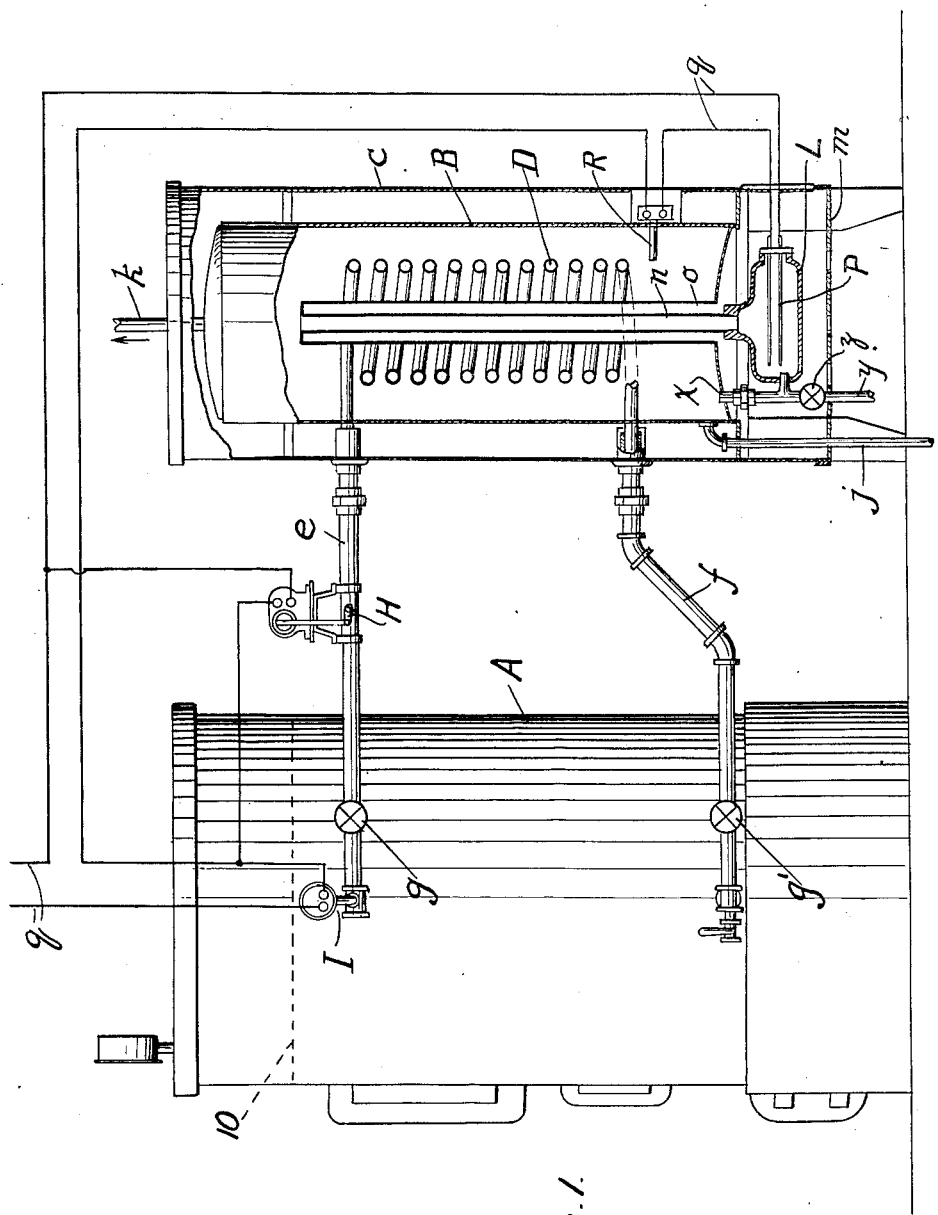
Figure 1 is a side elevation, partly in section, of a water heating system in accordance with this invention.

Referring more particularly to Figure 1, A indicates a domestic heating plant or furnace, which may be of any usual type, as steam, hot water, vapor, or the like.

B indicates a storage tank for a domestic hot water supply. The space surrounding the tank B is packed with insulating material which is held in place by the casing C.

Within the tank B and extending vertically is a coil D, the ends of which respectively are spaced from the top and bottom of the tank. The coil D is connected at its ends to the furnace A through pipes $e$ and $f$, respectively, it being noted that if the furnace is of the steam or vapor type the pipes $e$ and $f$ will be both connected below the water line, indicated at 10, within the furnace.

The pipes $e$ and $f$ are each provided with a manually operated shut-off valve $g$, $g'$ and a valve H, adapted to be electrically operated, or of the sylphon bellows type, is provided in pipe $e$. A thermostat I extending within the furnace is arranged, as will be more specifically detailed hereinafter, to control the operation of valve H.

The storage tank B is connected with a supply of water, through a pipe $j$ and is connected to the domestic hot water line through a pipe $k$.

Beneath the tank B, or, if desired, formed within the tank at its lower end, is a water chamber L, surrounded by an insulating casing $m$, and from which a pipe $n$ extends within the tank B to a point adjacent its upper end. About the pipe $n$ is a sleeve $o$ closed at its top and forming an annular air space about the pipe $n$, in its extension within the tank B, which serves to insulate the pipe $n$ from the water in tank B.

Within the chamber L is an electric heating element P connected into an electric circuit $q$, into which is connected a thermostat R positioned within the lower portion of the tank B and serving to control the element P. Water is supplied to the chamber P from the bottom of the tank B through a pipe $x$ which may be connected to a drain controlled by a suitable valve $z$.

The thermostat I controlling the electrically operated valve H is likewise connected into circuit $q$, as is the operating mechanism of the valve H, so that, as will be observed, the heating element P will not be energized until the circuit $q$ is closed by both the thermostat I and and the thermostat R and that hence the element P will not be energized until the valve H is closed by a closing of the circuit through its actuating mechanism through the medium of the thermostat, the valve H being set to be closed on closing of the circuit through its actuating mechanism and to open an opening of the circuit.

The operation of the system shown in Figure 1 will now, it is believed, be readily understood. Assuming the furnace A to be in operation, the hot water in the furnace will activate the thermostat to break the circuit $q$, thus causing valve H to assume an open position, and prevent the energizing of the heating element P.

Hot water from the furnace will circulate through the coil D and through heat interchange water in the tank B will be heated.

It will be noted that despite the closing of circuit $q$ by thermostat R, under the influence of the temperature of the water in the lower part of tank B, the element P will not be energized due to the fact that the hot water in the furnace acting through the thermostat I will keep the circuit q open so long as the water in the furnace is at a temperature sufficiently high to efficiently heat water in tank B by circulation through coil D.

If now the temperature of the water in the furnace becomes too low to efficiently heat water in the tank B, or if, as in summer, the furnace is not operated, the thermostat will close the circuit q causing the valve H to be closed and the thermostat R on cooling of the water in the lower part of tank B will close circuit o and the element P will be energized.

When element P is energized, it will heat water in the chamber L and a circulation between the tank B and chamber L will be set up through pine n in which hot water will rise to the upper part of the tank B, and pipe x through which cool water will enter the chamber L from the lower part of tank B.

Due to the arrangement of the thermostat I and the thermostat R, it will be noted that when the heating element P is energized the valve H will be closed, thus preventing circulation between the coil D and the furnace. When the temperature of the water in the furnace is such as to heat the water in the tank B through circulation through coil D, the valve H will be open and the circuit q broken by the aquastat I so that element P cannot be energized by the action of the thermostat in closing the circuit.

Figure 2:
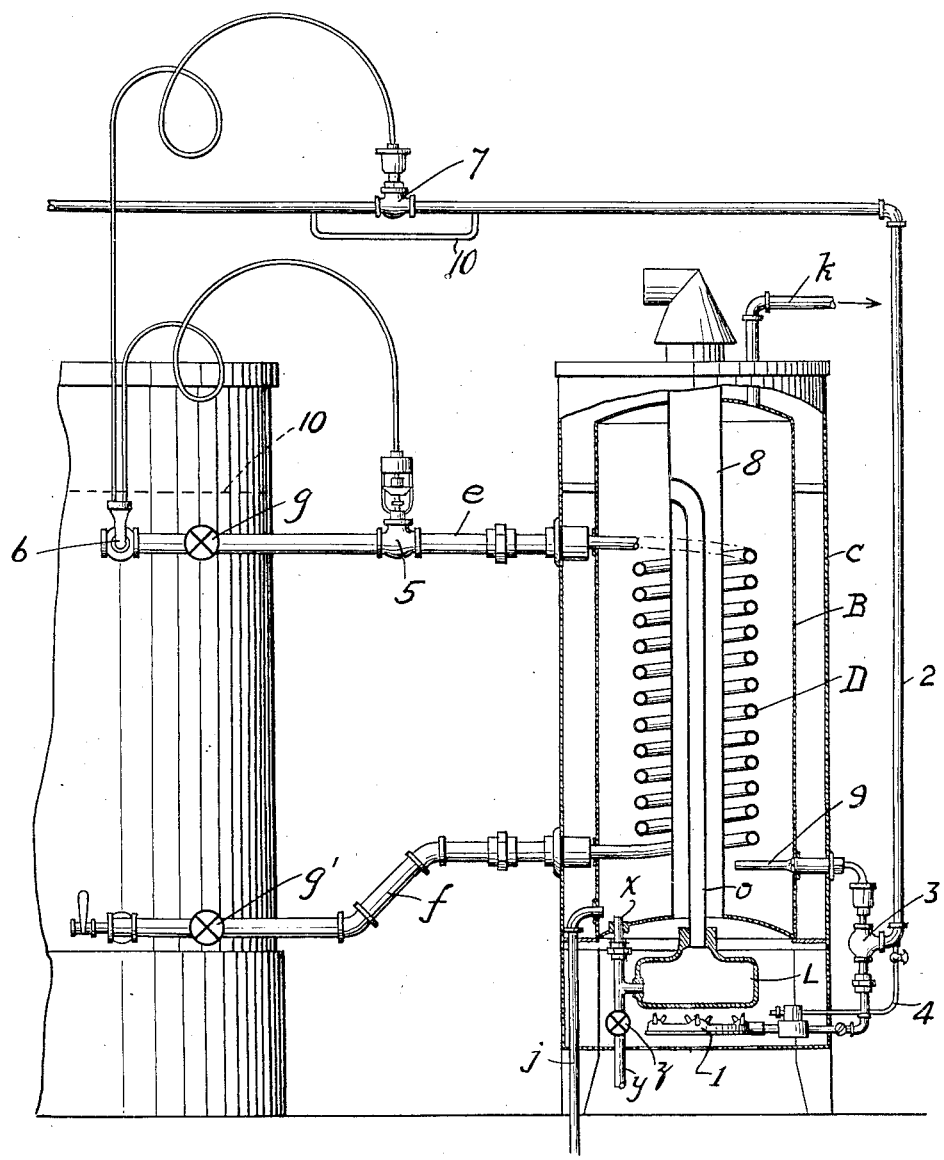
Figure 2 is a side elevation, partly in section, of a modification of the system shown in Figure 1.

Referring now to Figure 2 in which is shown a system similar to that described with reference to Figure 1, except for the provision of a gas burner in place of the electric heating element P, in Figure 2 the several elements, which are the same as those shown in Figure 1, are denoted by the same reference letters.

In the system shown in Figure 2 a gas burner 1 is positioned beneath chamber L and is adapted to be supplied by means of a gas line 2, controlled adjacent the burner by a thermostatic valve 3, controlled by an element 9 extending within the tank B. A pilot burner is provided and is supplied by a line 4, which by-passes the valve 3. In the pipe e, connecting the coil D with the furnace, there is provided a thermostatic or sylphon valve 5 controlled by an element 6 extending within the furnace A and which element also acts to control a thermostatic, or sylphon, valve 7 in the main gas line 2.

The pipe o connecting chamber L with the tank B extends upwardly through a flue 8 and enters the upper part of the tank laterally. The flue extends through the tank and connects with a chimney for the discharge of hot gases of combustion from the burner 1. Through heat interchange the hot gases passing through the flue 8 heat water in the tank B and in pipe n.

The operation of the system shown in Figure 2 is similar to that of the system shown in Figure 1 in that when the water in the furnace is sufficiently hot to heat water in tank B by circulation through coil D the valve 5 is open and the burner is prevented from operating by the closure of valve 7 in the main gas line under the influence of element 6, irrespective of the opening of valve 3 under the influence of element 9. Incidently the valve 7 when closed, permits sufficient gas to pass to supply the pilot burner, or a by-pass 10 capable of passing sufficient gas for the pilot burner may be provided.

When the furnace becomes insufficiently hot to heat the water in tank B the valve 5 will be closed and gas valve 7 opened, thus permitting the burner 1 to be operated under control of element 9 and preventing circulation between coil D and the furnace.

Figure 3:
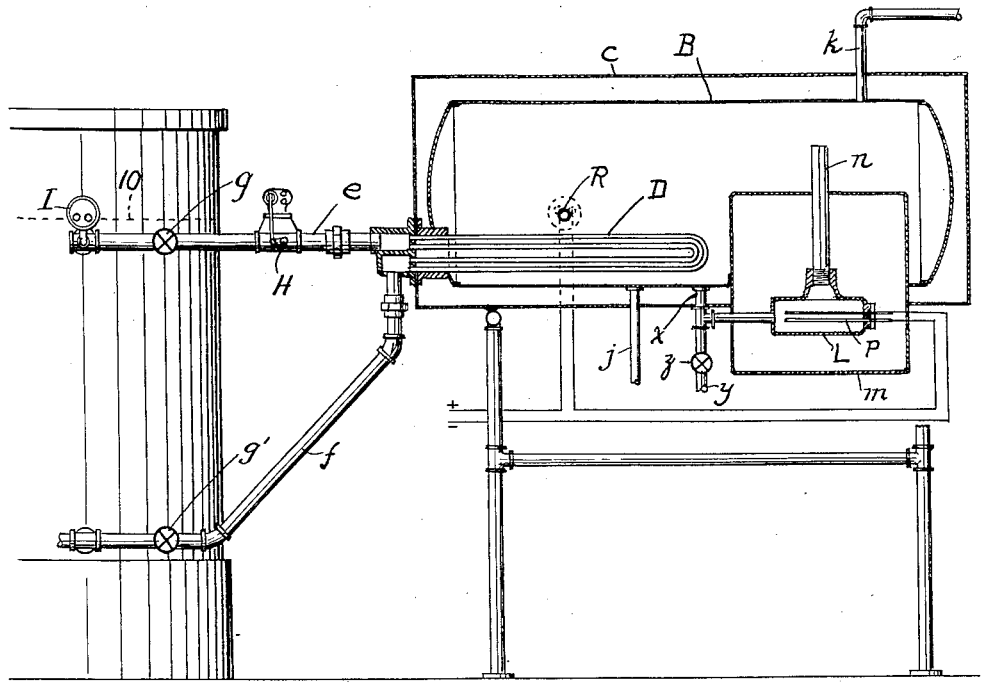
Figure 3 is a side elevation, partly in section, of a further modification of the system shown in Figure 1.

The system shown in Figure 3 is the same as that shown in Figure 1, except for adaptation of the elements to a horizontal as compared with a vertical hot water storage tank. In Figure 3 the various elements the same as those shown in Figure 1 are indicated by the same reference letters used in Figure 1.

Figure 4:
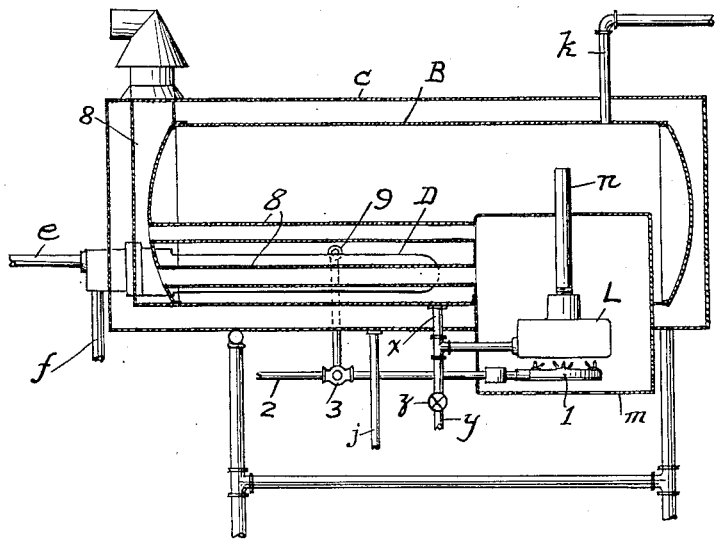
Figure 4 is a sectional view showing a modification of the system shown in Figure 3.

The system shown in Figure 4 is the same as that shown in Figure 2, except for adaptation to a horizontal as compared with a vertical hot water storage tank and for omission of a showing of the furnace and circulation and gas control valves which may be identical with those shown in Figure 2.

It will be appreciated that various modifications in details of construction and arrangement over those shown and described herein for illustrative purposes may be made without departing from the scope of this invention; and as will be obvious, the system embodying this invention may be adapted to various types of heating devices other than electric and gas heaters, as, for example, oil heaters, within the scope of the invention involved.

What I claim and desire to protect by Letters Patent is:

1. A hot water heating system including in combination a storage tank, means for the supply of water to said tank, heat exchange means for heating water in the storage tank, means for supplying a heated fluid to said heat exchange means, an independent heating element arranged to heat water in said storage tank, means controlled by the temperature of water in said tank for activating said independent heating element and means controlled by the temperature of said heated fluid for preventing activation of said independent element when the temperature of said heated fluid is above a predetermined minimum.

2. A hot water heating system including a storage tank, a domestic furnace containing a heating fluid, a coil within said tank and connected for the circulation therethrough of water from said furnace, a valve arranged to control circulation through said coil, an independent heating means arranged to heat water in said tank, a thermostat within said tank and arranged to control said independent heating means and a thermostat within said furnace arranged when a heating fluid in said furnace is above a predetermined temperature to control said valve to permit circulation through said coil and to prevent operation of said independent heating means and when the temperature of a heating fluid in said furnace is below said predetermined temperature to control said valve to prevent circulation through said coil and permit operation of said independent heating means.

JULIAN S. SIMSOHN.